April 15, 1930.  J. A. GRANT  1,755,160
TRACTOR WHEEL
Filed Feb. 13, 1929  3 Sheets-Sheet 1
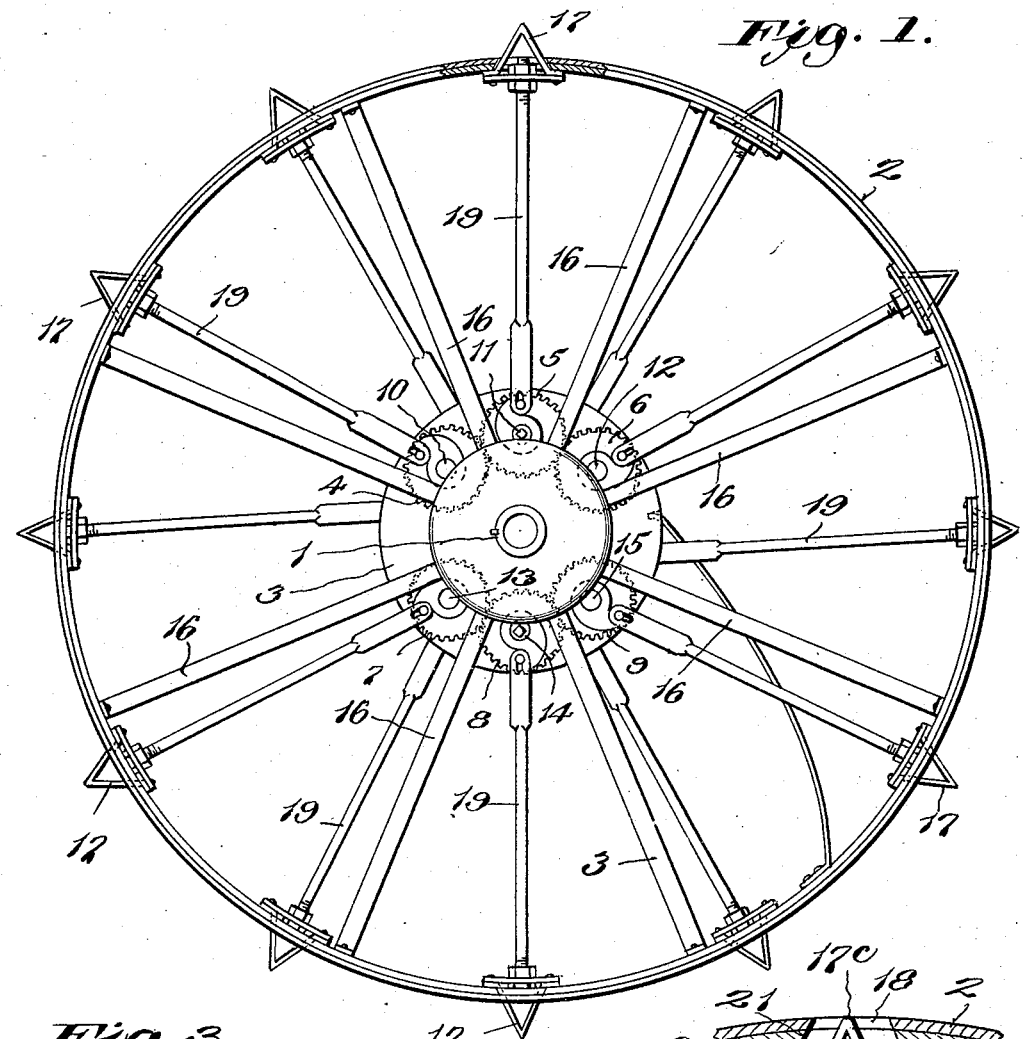
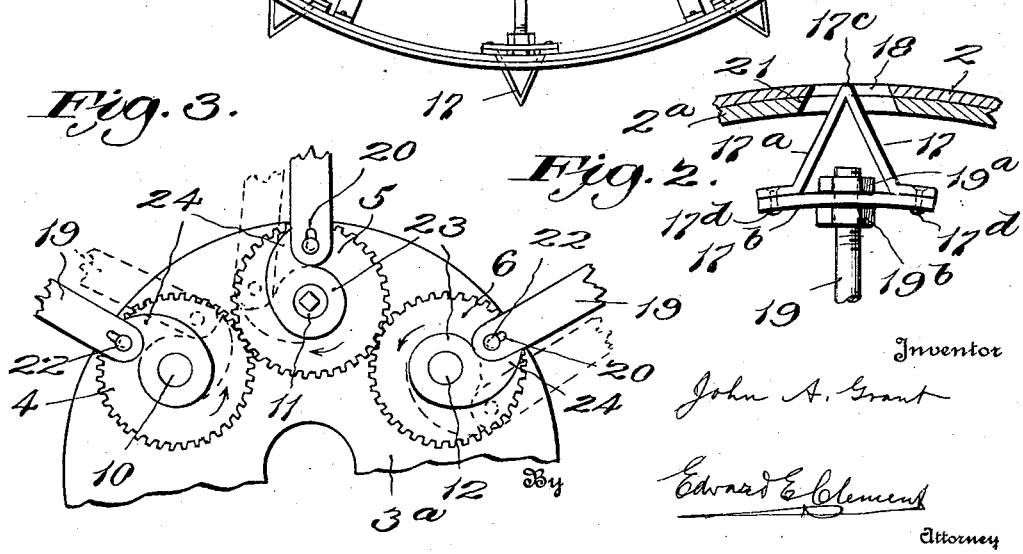

April 15, 1930.  J. A. GRANT  1,755,160
TRACTOR WHEEL
Filed Feb. 13, 1929  3 Sheets-Sheet 2
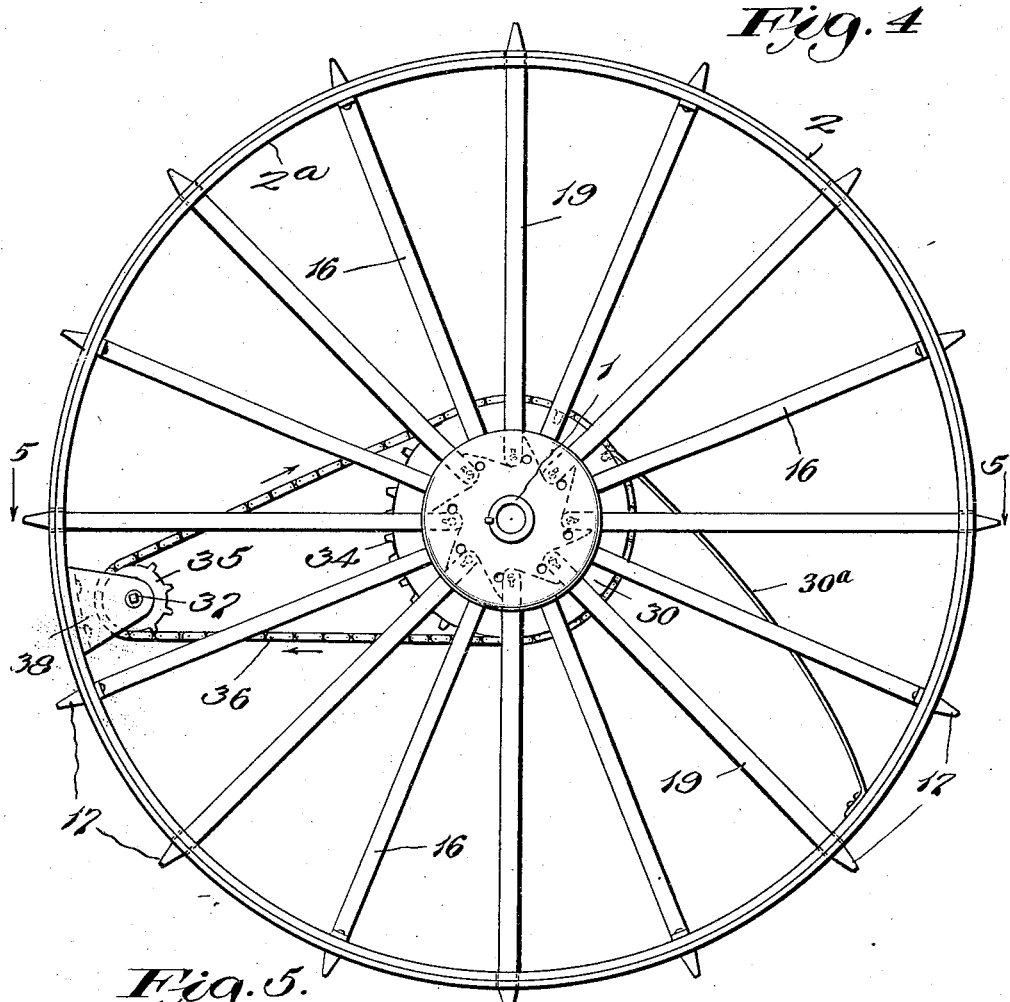
Inventor
John A. Grant
By Edward E. Clement
Attorney April 15, 1930.  J. A. GRANT  1,755,160
TRACTOR WHEEL
Filed Feb. 13, 1929   3 Sheets-Sheet 3

Inventor
John A. Grant
By Edward E. Clement
Attorney

Patented Apr. 15, 1930

1,755,160

UNITED STATES PATENT OFFICE

JOHN A. GRANT, OF TRUMANSBURG, NEW YORK

TRACTOR WHEEL

Application filed February 13, 1929. Serial No. 339,679.

My invention relates to tractors and particularly to tractor wheels. It has for its object the provision of means whereby the tractor wheel, regardless of the weight imposed upon it, may ride smoothly and without jolting over smooth surfaces such as that of a modern hard surfaced road, and may have increased tractive effect when riding over soft earth or the like. I attain my object by providing movable lugs controlled from the center or hub of the wheel and so arranged that at all times, regardless of the position of the lugs, the weight on the wheel is carried by the hub and therefore by the shaft or axle, in a direct radial line through the peripheral point of contact with the supporting medium. In other words, instead of providing means for transferring the weight from the lug to the rim, which would produce strain on the rim even in soil, I transfer the weight from the lug directly through a thrust member to the hub and so to the shaft.

More specifically stated, I attain my object by providing a central system of gears and eccentrics which move radial thrust rods or ribs in and out as they are turned, said thrust rods carrying at their outer ends the lugs which are moved into and out of operative position through openings in the rim. In order to prevent weakening of the rims by cutting away the metal in these openings, I preferably re-enforce the same, in a manner to be hereinafter described.

My invention is fully disclosed in the accompanying drawings and in the detailed description hereinafter, from which other and ancillary features of invention and objects will sufficiently appear.

Referring to the drawings,

Fig. 1 is a side view of one form of wheel embodying my invention;

Fig. 2 is a view on an enlarged scale of a detail thereof;

Fig. 3 is a fragmentary view on an enlarged scale of the hub and one operating pinion in the form shown in Fig. 1;

Fig. 4 is a side view of a modified form of wheel embodying the same;

Fig. 5 is a section thereof on the line 5—5 of Fig. 4 looking in the direction of the arrows;

Figure 6:
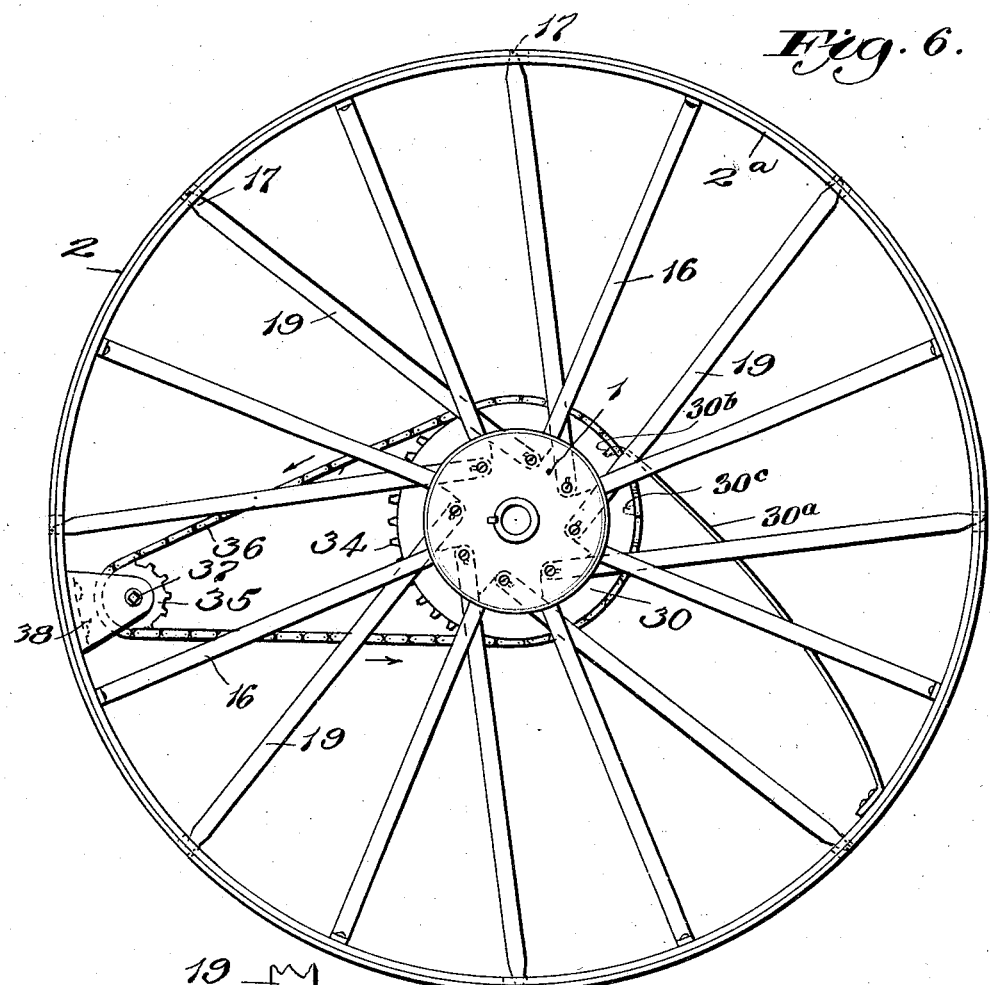
Fig. 6 is a side view of the same.
Figure 7:
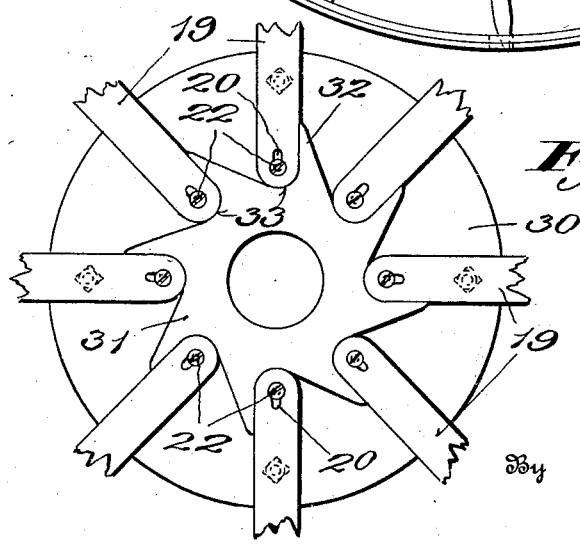
Fig. 7 is a detailed view on an enlarged scale of the thrust piece on the hub of the wheel in Figs. 4, 5 and 6.

In the drawings, and referring first to Figs. 1, 2 and 3, 1 is the hub of the wheel, 2 is the rim, and 16 are the spokes connecting the hub and rim. The hub 1 consists essentially of two opposite discs $1^a$ and $1^b$ with the central tube uniting them. Upon this tube and within the hub plates are assembled the parts which when secured together and to the hub itself, form the thrust block or pinion support for the movable lugs. This block is marked 3, and is integral with and immovable upon the hub.

On opposite sides of one face of the thrust block 3 are journalled the two sets of pinions 4—5—6 and 7—8—9. The first set 4—5—6 are in mesh so that they always turn together, and the second set are in mesh so that they always turn together. On the opposite face of the thrust block are other pinions arranged in two sets in the same manner, corresponding in every particular to the pinions 4 to 9, and the corresponding pinions of each set are connected through the shafts 10—11—12 and 13—14—15, respectively. Thus the pinion 4 and the corresponding pinion on the other face of the thrust block 3 turn together, and so with all the others.

In the wheel shown there are sixteen spokes which are indicated by the numeral 16, eight on each side. There are twelve movable lugs around the rim 2, six on each side, these lugs being indicated by the numeral 17 and working into sockets 18 in the rim 2 (see Fig. 2).

Each of the lugs 17 is carried on the outer end of a thrust rod 19, the inner end of which is pivoted eccentrically on one of the pinions 4—5—6, etc. The inner end of each thrust rod is provided with a slot to receive the pivot screw securing it to its pinion, and this slot 20 permits radial play in and out of the thrust rod for a purpose to be described. Each lug 17 is formed of two pieces of steel or equivalent metal 17ª and 17ᵇ, the latter forming the base of a triangular figure, whereof the apex 17ᶜ moves in and out through a correspondingly shaped opening 21 in the rim 2. The plates 17ª and 17ᵇ are secured together at the points 17ᵈ by rivets or equivalent devices so as to leave a flat base or stop for engagement with the inner face of the hub when the point of the lug 17ᶜ is projected out through the rim. In order to maintain a constant fit, so that the lugs will never be loose or rattle and will always be kept up with their face plates against the rim, I provide the outer end of each thrust rod 19 with adjustable set nuts or burrs 19ª and 19ᵇ inside and outside of the plate 17ᵇ of the lug.

The reason for the slot in the inner end of the thrust rod 19 will now be explained. As a pinion (for example 6) is rotated in the direction of the arrow it throws out the thrust rod 19 and correspondingly throws out the lug 17 until its point 17ᶜ projects through the opening in the rim, its side faces 17ª engage the face 21 of said tapered opening, and the projections 17ᵈ engage the inner face of the rim. Up to this point, the rod depends entirely upon the screw or stud 22 carried on the pinion, for its movement. This stud however would not be sufficient to take the thrust of the lug and thrust rod in operation, that is when the wheel is rotating, and so I provide a socket piece 23 on each pinion having one side cut out to form a cam face with a projecting edge 24. This socket piece is rigidly secured to the pinion, and moves with it. When the pinion reaches the end of its rotational movement, the edge or shoulder 24 will come against the side of the thrust rod 19, and the inner end of the latter will rest in the socket formed by the cut-away portion, and radially in direct line with the center of the pinion and the hub of the wheel. If the lug 17 has been properly adjusted on the end of the thrust rod 19, there will then be one continuous line of thrust transmission from the point or toe 17ᶜ on a radial line straight through to the hub and shaft of the wheel. This is due to the play afforded the pin 22 in its slot in the inner end of the thrust rod 19, wereby the latter rests directly upon the solid abutment furnished by the socket piece 23.

Turning now to the modification shown in Figs. 4, 5, 6 and 7, 1 is the hub, 2 is the rim, 16 are the spokes, and 19 are the thrust rods. In this case however, instead of the inner ends of the thrust rods being pivotally secured upon pinions, as in Figs. 1 and 3, they are pivotally secured directly to the thrust block 30 (see Figs. 5, 6 and 7), which also carries two projecting socket pieces 31 having as many shoulders 32 and as many sockets 33 as there are thrust rods 19. Each thrust rod as before is provided with a slot 20, working on the stud or screw pivot 22 by which it is secured to the main thrust block 30.

The operation of each of these two forms is as follows:

Referring to Figs. 1, 2 and 3, each set of pinions 4—5—6 and 7—8—9, is provided with one key pinion having a stud on shaft 11 to fit a key which may be applied thereto to turn that pinion and by means of its geared teeth to turn the associated pinions so that by means of their eccentric connections they will move their thrust rods 19 in or out as the case may be. It will be recalled that each of the pinions on both sides of the block 3 is keyed to its shaft, and these shafts run through so that the corresponding pairs on opposite faces are keyed together. By turning one pinion on either side therefore they can all be turned, and all the thrust rods connected to them can be thrown in or out.

Referring now to Figs. 4, 5, 6 and 7, the operation is the same so far as the lugs, their fitting, and their relation to the rim are concerned. To operate the lugs however the entire set of thrust rods are operated together by turning the main thrust block 30 on the hub. This is accomplished in any suitable and convenient manner as for example by means of the sprocket wheels 34—35 and chain 36. The sprocket wheel 35 is rigidly connected to a shaft 37 having one end squared to receive a suitable crank or key; and the shaft is supported on a frame 38 secured on the rim, for convenience of access. The thrust block 30 is locked when set in either position, that is with the lugs in or with the lugs out, by means such as a spring pawl 30ª secured on a solid abutment such as the rim of the wheel, and engaging alternately in either one of the two notches 30ᵇ—30ᶜ as shown in Figs. 4 and 6. This pawl or the equivalent is disengaged from the thrust block when the latter is to be turned, and it will be understood that any equivalent locking device may be substituted for the spring pawl shown without departing from the invention.

It will be noted that in either form of my invention, the lugs 17 project through openings in the rim. Inasmuch as the rims of tractor wheels as ordinarily constructed are of metal of just sufficient thickness to preserve their shape under the loads to which they are subjected, the abstraction of any considerable mass of such metal by cutting openings in the rim might weaken it and cause buckling or the like. For this reason I provide a reenforced rim 2ª, or the equivalent in separate individual re-enforcing means applied around the openings 18. In the latter case the re-enforcing rim can be made in the shape of a tubular socket which will guide the thrust rod if desired in its movement in and out, allowing for play. The taper of the lug itself will take care of such play and keep it always tight when it is forced out into position.

In throwing out the lugs the form of wheel shown in Fig. 1 may rest on one side while the lugs on the other are thrown out, and may then be turned around so that the remaining lugs may be projected, but in the form shown in Figs. 4 to 7, it may be necessary to run the wheel up on a block before the lugs can be projected.

What I claim is:

1. In a traction wheel, the combination of a hub, a rim concentric with said hub, spokes uniting the hub and rim, openings in the rim, thrust rods having teeth at their outer ends, operating means for the thrust rods comprising a disc rotatable on said hub, means pivoting the inner ends of the rods directly on said disc, including pin and slot connections, and bearings formed on said disc, the inner ends of the thrust rods resting on said bearings, whereby the thrust of the rods is transmitted directly to the bearings, said teeth adapted to be projected through said openings in the rim or retracted by rotation of said disc.

2. The traction wheel described in claim 1, with the following additional elements: projecting teeth on the operating disc adapted to follow and engage the thrust rods when turned into radial positions, and means to prevent retraction of said disc when so turned.

3. The traction wheel described in claim 1, having a common operating disk for all the thrust rods, the inner ends of all of said rods being pivoted on the faces of said disk, and central raised portions on the disk having peripheral bearing surfaces receiving the ends of said rods, a tooth projecting from a central raised portion between each two rods, said tooth having one face shaped to engage one of said rods when the rod is turned into radial position and the other face of said tooth adapted to engage the preceding rod and disengage the first rod when the rods are turned out of radial position, whereby said teeth constitute stops for the rods both in the projecting and the retracting positions.

4. The traction wheel described in claim 1, having a common operating disk for all the thrust rods, the inner ends of all of said rods being pivoted on the faces of said disk, and central raised portions on the disk having peripheral bearing surfaces receiving the ends of said rods, a tooth projecting from a central raised portion between each two rods, said tooth having one face shaped to engage one of said rods when the rod is turned into radial position and the other face of said tooth adapted to engage the preceding rod and disengage the first rod when the rods are turned out of radial position, whereby said teeth constitute stops for the rods both in the projecting and the retracting positions, together with means to turn said disk and means to lock the same in either the projecting or the retracting position.

In testimony whereof I hereunto affix my signature.

JOHN A. GRANT.